US012104357B2

(12) United States Patent
Schwittay

(10) Patent No.: US 12,104,357 B2
(45) Date of Patent: Oct. 1, 2024

(54) METHOD FOR DAMPING A MOVABLY MOUNTED ATTACHMENT PART OF A MACHINE AND THE MACHINE

(71) Applicant: Robert Bosch GmbH, Stuttgart (DE)

(72) Inventor: Olaf Schwittay, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/990,966

(22) Filed: Nov. 21, 2022

(65) Prior Publication Data

US 2023/0160178 A1 May 25, 2023

(30) Foreign Application Priority Data

Nov. 22, 2021 (DE) ..................... 10 2021 213 085.2

(51) Int. Cl.

*E02F 9/22* (2006.01)
*E02F 3/42* (2006.01)
*E02F 9/26* (2006.01)
*F15B 21/00* (2006.01)

(52) U.S. Cl.

CPC ............ *E02F 9/2207* (2013.01); *E02F 3/422* (2013.01); *E02F 9/2221* (2013.01); *E02F 9/265* (2013.01); *F15B 21/008* (2013.01)

(58) Field of Classification Search

CPC ....... E02F 3/422; E02F 9/2207; E02F 9/2221; E02F 9/265; F15B 21/008; F15B 11/165

See application file for complete search history.

(56) References Cited

U.S. PATENT DOCUMENTS 6,219,601 B1 * 4/2001 Shono .................. B60G 17/018 701/37
8,033,209 B2 * 10/2011 Jessen .................. F15B 11/028 701/50
10,066,610 B2 * 9/2018 Yamada ................ E02F 9/2235
2014/0026548 A1 * 1/2014 Vigholm ............... E02F 9/2095 60/431
2018/0281550 A1 * 10/2018 Masamura ............. B60G 17/08
2020/0115882 A1 * 4/2020 Sano ..................... E02F 9/2267
2020/0149249 A1 * 5/2020 Rannow .................. E02F 3/432

* cited by examiner

*Primary Examiner* — Kenneth Bomberg
*Assistant Examiner* — Matthew Wiblin
(74) *Attorney, Agent, or Firm* — Maginot, Moore & Beck LLP

(57) ABSTRACT

The disclosure relates to a method for damping a movably mounted attachment part of a machine, wherein the attachment part is movable by means of a hydraulic cylinder, wherein the hydraulic cylinder is actuated via a hydraulic pump, comprising: receiving a measured value of a pressure (P) in a load-side chamber of the hydraulic cylinder during a measurement phase, and controlling the hydraulic pump to adjust the pressure in the load-side chamber of the hydraulic cylinder to the measured value as a setpoint value during operation of the machine for damping the movably mounted attachment part.

9 Claims, 1 Drawing Sheet

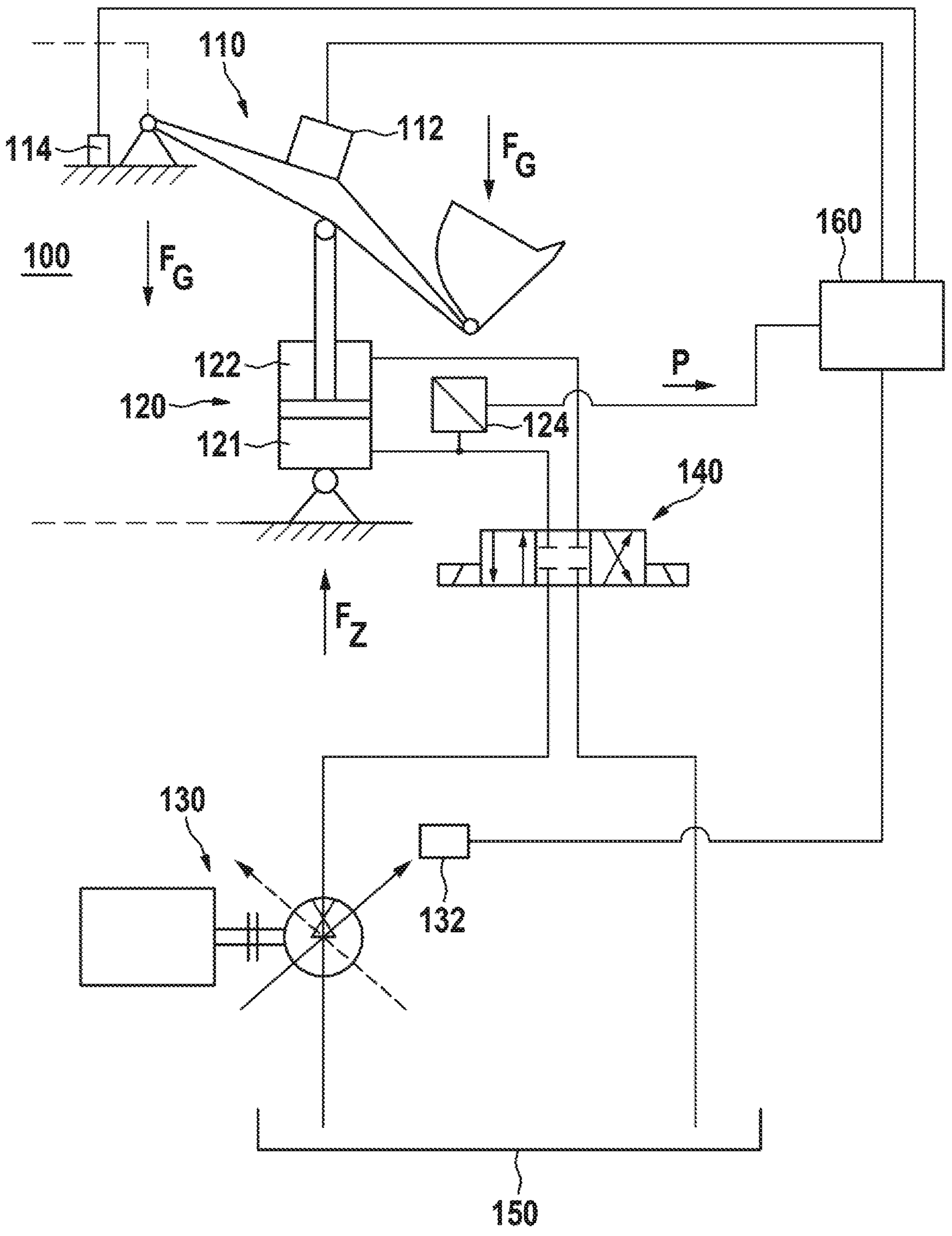
110
112
114
$F_G$
$F_G$
100
160
122
120
121
124
P
140
$F_Z$
130
132
150

METHOD FOR DAMPING A MOVABLY MOUNTED ATTACHMENT PART OF A MACHINE AND THE MACHINE

This application claims priority under 35 U.S.C. § 119 to patent application no. DE 10 2021 213 085.2, filed on Nov. 22, 2021 in Germany, the disclosure of which is incorporated herein by reference in its entirety.

The present disclosure relates to a method for damping a movably mounted attachment part of a machine, wherein the attachment part can be moved by means of a hydraulic cylinder, wherein the hydraulic cylinder is actuated via a hydraulic pump, and to a processing unit and a computer program for the implementation of same, as well as such a machine having an attachment part.

BACKGROUND

Machines, in particular work machines or other movable or drivable machines, in particular vehicles, can have movable attachment parts which can be moved by means of a hydraulic cylinder. Such attachment parts can be, for example, an excavator arm of an excavator, a front loader of a tractor or the like.

When the attachment part moves relative to the rest of the machine, or also for example during the driving of the machine, vibrations of the attachment part can occur which are transferred to the rest of the machine. Compensating for such vibrations is sometimes complex and optionally requires complex torque management or additional components.

It is therefore desirable to specify a simple and cost-effective possibility for damping a movably mounted attachment part of a machine.

SUMMARY

The disclosure relates to a method for damping a movably mounted attachment part of a machine, to a processing unit and to a computer program for implementing same, as well as to such a machine having the features disclosed herein. Advantageous embodiments are the subject matter of the disclosure and the following description.

The disclosure relates to machines having a movable attachment part (or add-on device) which can be moved by means of a hydraulic cylinder. The attachment part can be a component of the machine itself, which, however, can be moved relative to the rest of the machine. Examples thereof include an excavator arm of an excavator or a front loader (with a bucket scoop or the like) of a tractor or wheel loader. The hydraulic cylinder is actuated via a hydraulic pump, in particular an electrohydraulic pump, for example in the form of an axial piston pump. In addition, a hydraulic valve, in particular a so-called control valve, can be provided in order to conduct the flow of hydraulic fluid from the hydraulic pump into the load-side (e. g., the bottom) chamber of the hydraulic cylinder to move the attachment part in a direction, counter to a load, e.g., for raising an excavator arm, or into the other, e.g., rod-side chamber of the hydraulic cylinder for moving the attachment part in the other direction, e.g., for lowering the digger arm. The relevant other chamber should then be connected to a tank.

To damp the movably mounted attachment part or movements of the attachment part and vibrations caused thereby, a (current) value of a pressure in the load-side chamber of the hydraulic cylinder is recorded or measured, specifically during a measurement phase. This value is then fed as a measured value, for example, to an executing processing unit where it is received. In addition, current position information of the attachment part, from, for example, location sensors and/or position sensors, can be taken into account. In the measurement phase, it must be ensured that precisely no vibration is present, for example when the machine and the attachment part are at a standstill.

Then, the hydraulic pump is controlled to adjust the pressure in the load-side chamber of the hydraulic cylinder to the measured value as setpoint value, and during operation of the machine. This serves to damp the movably mounted attachment part. In particular, the hydraulic pump should be set up in both directions, that is to say for conveying into the load-side chamber and out of the chamber; it should therefore be a so-called two-quadrant pump.

In other words, a pressure regulator of the hydraulic pump is thus adjusted to the static load pressure in the load-side, e.g. bottom, chamber (or bottom) of the hydraulic cylinder. The hydraulic pump will then keep the pressure in the load-side chamber constant. In this case, any dynamic changes in the pressure, such as those caused by a movement of the attachment part, in particular relative to the rest of the machine, for example as a result of driving the machine, are adjusted by the hydraulic pump.

The location or position sensors also make it possible to adapt the pressure setting of the hydraulic pump such that the attachment part can be held in a safe position. In other words, position information of the attachment part, in particular from one or more location or position sensors, is obtained and the setpoint value is adapted as a function of the position information and a predetermined or desired position of the attachment part.

Preferably, at least one further component of the machine, in particular a drive, is actuated via the hydraulic pump. In this case, pressure and/or torque changes arising during the adjustment of the pressure in the load-side chamber of the hydraulic cylinder can be taken into account, in particular compensated, during operation of the at least one further component. Thus, the torques introduced by the hydraulic pump, for example into the drive train, do not affect the driving dynamics. They are compensated by appropriate machine management. This applies correspondingly to power output and power consumption.

A processing unit according to the disclosure, e.g., a control unit of a work machine or vehicle, is configured, in particular programmatically, to carry out a method according to the disclosure.

The disclosure also relates to a machine, in particular a vehicle, having a movably mounted attachment part, which is movable by means of a hydraulic cylinder, wherein the hydraulic cylinder can be actuated via a hydraulic pump, and further having a processing unit according to the disclosure.

The implementation of a method according to the disclosure in the form of a computer program or computer program product with program code for carrying out all method steps is also advantageous since this results in particularly low costs, in particular if an executing control unit is also used for further tasks and is therefore present in any event. Suitable data carriers for providing the computer program are, in particular, magnetic, optical, and electric storage media, such as hard disks, flash memory, EEPROMs, DVDs, and others. It is also possible to download a program via computer networks (Internet, Intranet, etc.).

Further advantages and embodiments of the disclosure can be found in the description and the accompanying drawing.

Of course, the features mentioned above and those still to be explained below can be used not only in the respectively specified combinations, but also in other combinations or alone, without departing from the scope of the present disclosure.

The disclosure is illustrated schematically in the drawing on the basis of an exemplary embodiment and is described in detail below with reference to the drawing.

BRIEF DESCRIPTION OF THE DRAWING

FIG. 1 schematically shows a machine according to the disclosure.

DETAILED DESCRIPTION

FIG. 1 schematically shows a machine 100 according to the disclosure in a preferred embodiment, on the basis of which a method according to the disclosure is also to be explained below in a preferred embodiment.

The machine 100, for example, has a movable attachment part 110 designed as an excavator arm, which is movable by means of a hydraulic cylinder 122. The hydraulic cylinder in turn is actuated via a hydraulic pump 130, in particular an electrohydraulic pump. For this purpose, the hydraulic pump 130, here an axial piston pump, is connected to a load-side, here the bottom, chamber 121 of the hydraulic cylinder via a hydraulic valve 140 designed as a control valve. The rod-side chamber 122 is then connected to the tank 150. Although the connections can also be connected differently by the control valve, the situation mentioned is to be used for the following method. For this purpose, the hydraulic valve is to be moved to the right from the position shown.

Furthermore, a location or position sensor 112 for detecting position information of the attachment part 110 is provided, a further location or position sensor 114 on a bearing (or frame), likewise a pressure sensor 124 for detecting a pressure P in the bottom chamber 121 and a pivot angle sensor 132 for detecting a pivot angle of the hydraulic pump. Likewise, a rotational speed sensor for detecting the rotational speed can be integrated there. The sensors are all connected to a processing unit 160 designed as a control unit, so that the corresponding measured values can be received there. For example, the location or position sensors allow particularly good control of the location and of the load pressure.

For example, a current value of the pressure p in the bottom chamber 121 is recorded during a measurement phase and stored as a measured value in the processing unit 160. This measured value results from a weight force $F_G$ which is exerted on the hydraulic cylinder by the attachment part 110.

The hydraulic pump 130 is then controlled to adjust the pressure in the bottom chamber 121 to the measured value as the setpoint value, specifically during operation of the machine 100. This ensures that the force $F_Z$ exerted on the attachment part by the pressure in the bottom chamber 121 and the hydraulic cylinder, which force counteracts the weight force $F_G$, remains constant, in any case as much as possible. As a result, when the weight force $F_G$ is reduced briefly due to a movement of the attachment part, as a result of which the pressure in the bottom chamber 121 is reduced, for example, this pressure is increased by the hydraulic pump. This prevents a vibration of the attachment part, since the hydraulic cylinder or the rod is tracked. The same applies conversely.

What is claimed is:

1. A method for damping a movably mounted attachment part of a machine, wherein the attachment part is movable by a hydraulic cylinder, and the hydraulic cylinder is actuated via a bidirectional hydraulic pump, the method comprising:

during a measurement phase, receiving a measured value of a pressure in a load-side chamber of the hydraulic cylinder; and during operation of the machine subsequent to the measurement phase, controlling a pressure regulator of the bidirectional hydraulic pump to the measured value as a setpoint value such that the bidirectional hydraulic pump conveys fluid into the load-side chamber and out from the load-side chamber to maintain the pressure in the load-side chamber of the hydraulic cylinder at the measured value so as to damp the movably mounted attachment part.

2. The method according to claim 1, further comprising:

during the controlling of the pressure regulator, adjusting a hydraulic valve arranged between the bidirectional hydraulic pump and the load-side chamber to connect the hydraulic pump to the load-side chamber.

3. The method according to claim 1, further comprising:

actuating a drive of the machine via the bidirectional hydraulic pump; and during the actuation of the drive, compensating for pressure and/or torque changes arising during the controlling of the pressure regulator.

4. The method according to claim 1, wherein the machine is a drivable vehicle.

5. The method according to claim 1, further comprising:

activating the controlling of the pressure regulator to adjust the pressure in the load-side chamber of the hydraulic cylinder in response to a control command initiated by an operator of the machine.

6. The method according to claim 1, further comprising:

receiving position information of the attachment part from one or more location or position sensors; and adjusting the setpoint value based on the position information and a predetermined or desired position of the attachment part.

7. A processing unit configured to carry out the method according to claim 1.

8. A non-transitory machine-readable storage medium comprising program instructions that, when executed by a processing unit, cause the processing unit to execute the method according to claim 1.

9. A vehicle, comprising:

a movably mounted attachment part;

a hydraulic cylinder configured to move the attachment part;

a bidirectional hydraulic pump configured to actuate the hydraulic cylinder, the hydraulic pump having a pressure regulator; and a processing unit configured to:

during a measurement phase, receive a measured value of a pressure in a load-side chamber of the hydraulic cylinder; and during operation of the machine subsequent to the measurement phase, control the pressure regulator of the bidirectional hydraulic pump to the measured value as a setpoint value such that the bidirectional hydraulic pump conveys fluid into the load-side chamber and out from the load-side chamber to maintain the pressure in the load-side chamber of the hydraulic cylinder at the measured value so as to damp the movably mounted attachment part.

* * * * *